United States Patent [19]
Pan et al.

[11] Patent Number: 6,104,125
[45] Date of Patent: *Aug. 15, 2000

[54] LINEAR ACTUATOR

[75] Inventors: Jia-Tian Pan, Hsinchu; Neng-Hsin Chiu, KaoHsiung; Tung-Chuan Wu, Hsinchu; Horng-Ru Wang, Taipei; Shih-Tong Cheng, Hsinchu, all of Taiwan

[73] Assignee: Industrial Technology Research Institute, Hsinchu, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 09/012,999

[22] Filed: Jan. 26, 1998

[51] Int. Cl.$^7$ ..................................................... H01L 41/08
[52] U.S. Cl. ............................................................. 310/328
[58] Field of Search ............................................... 310/328

[56] References Cited

U.S. PATENT DOCUMENTS

| | | | |
|---|---|---|---|
| 4,714,855 | 12/1987 | Fujimoto | 310/328 |
| 4,736,131 | 4/1988 | Fujimoto | 310/328 |
| 5,027,027 | 6/1991 | Orbach et al. | 310/317 |
| 5,268,621 | 12/1993 | Hamers et al. | 318/116 |
| 5,319,257 | 6/1994 | McIntyre | 310/328 |
| 5,523,643 | 6/1996 | Fujimura et al. | 310/328 |
| 5,903,085 | 5/1999 | Karam | 310/328 |

*Primary Examiner*—Clayton LaBalle
*Assistant Examiner*—Peter Medley
*Attorney, Agent, or Firm*—W. Wayne Liauh

[57] ABSTRACT

A linear actuator includes two spaced seats connecting by a center piezoelectric member. The seats are mounted in a rail frame. Each seat has a piezoelectric member and an elastic zone for engaging or disengaging with the rail frame. Through energizing and disenergizing the center piezoelectric member alternately, the center piezoelectric member may be extended or contracted alternately, and thus moves the seats, consequently the actuator, longitudinally along the rail frame. A linear and accurate movement of the actuator thus may be achieved at micro meter level.

9 Claims, 8 Drawing Sheets

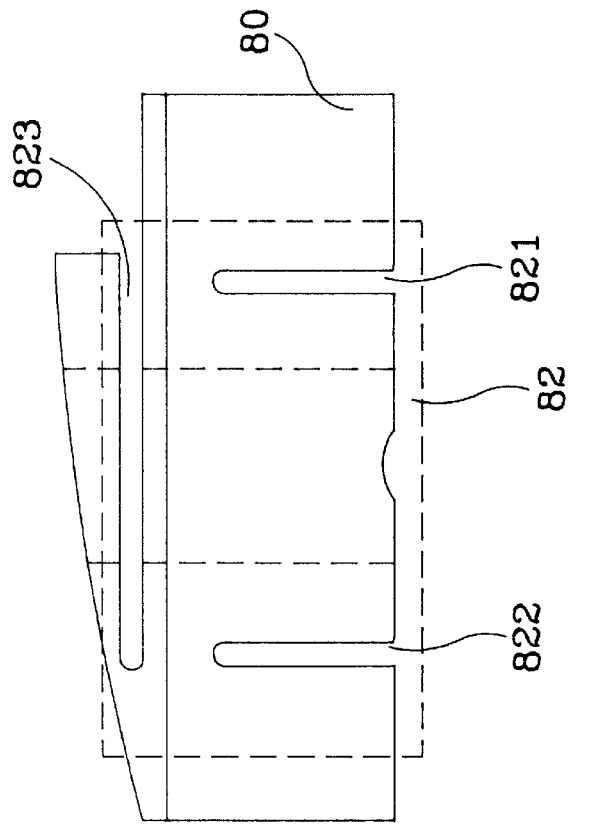
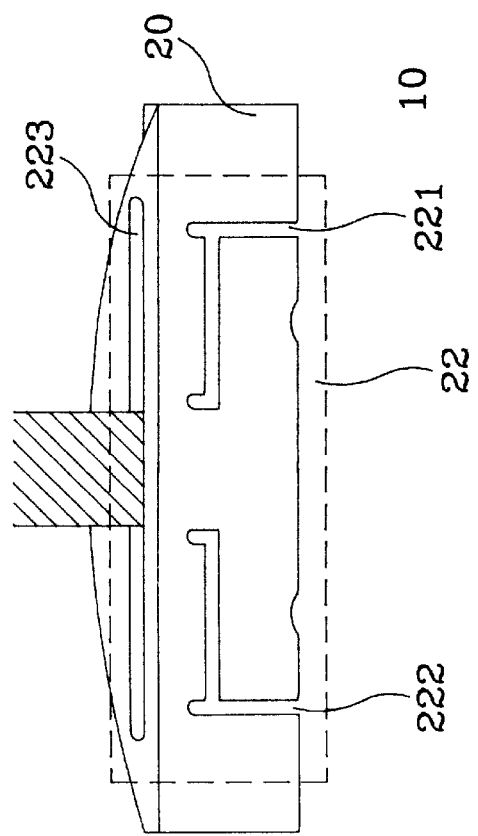

LINEAR ACTUATOR

BACKGROUND OF THE INVENTION

1. Field of the Invention

This invention relates to a linear actuator using a piezoelectric member for producing accurate and micro linear movement.

2. Description of the Prior Art

In semiconductor and precision machinery industries there is an increasing need for providing an actuator that can producing a micro linear displacement down to nano meter (nm) level. However conventional actuators usually employ spring as braking means.

The spring force is generally not steady and difficult to achieve accurate micro movement. It is also not able to support large cutting force. FIGS. 1A and 1B show a conventional linear actuator which includes a front seat 2, a back seat 3, a first piezoelectric member 4 located in the front seat and a second piezoelectric member 5 located in the back seat. The actuator is mounted in a rail frame 1 which has a spring 6 located on one lateral side for controlling the linear feeding movement of the actuator. When in use, the second piezoelectric member 5 engages with two lateral sides at the rail frame 1, the first piezoelectric member 4 makes the front seat 2 to have frictional contact with the two lateral sides of the rail frame 1, the spring 6 provides additional friction force for this purpose.

The spring 6 also help to eliminate the gap between the front seat 2 and the rail frame 1. However the spring usually cannot sustain large cutting force (i.e., reacting force). The feeding motion and displacement is difficult to control. It is therefore difficult to achieve accurate movement and control.

SUMMARY OF THE INVENTION

In view of aforesaid disadvantages, it is an object of this invention to provide a linear actuator that employs push feeding and elastic zone structure to achieve accurate and steady micro movement for a long distance.

It is another object of this invention to provide a linear actuator that can support large cutting force. This invention therefore is more versatile and may be adapted to a wide range of applications.

The actuator according to this invention includes two actuating seats and a micro feeding piezoelectric member located between the seats. Each actuating seat also has a piezoelectric member and an elastic zone for controlling the feeding movement and supporting large cutting force.

By means of aforesaid structure, more accurate feeding motion and large cutting force support may be obtained.

BRIEF DESCRIPTION OF THE DRAWINGS

The invention, as well as its many advantages, may be further understood by the following detailed description and drawings in which:

FIG. 4 is a fragmentary top view of a second elastic zone of a back seat shown in FIG. 2.

FIG. 9 is a fragmentary top view of a first elastic zone of a front seat shown in FIG. 8.

DETAILED DESCRIPTION OF THE PREFERRED EMBODIMENT

Figure 1A:
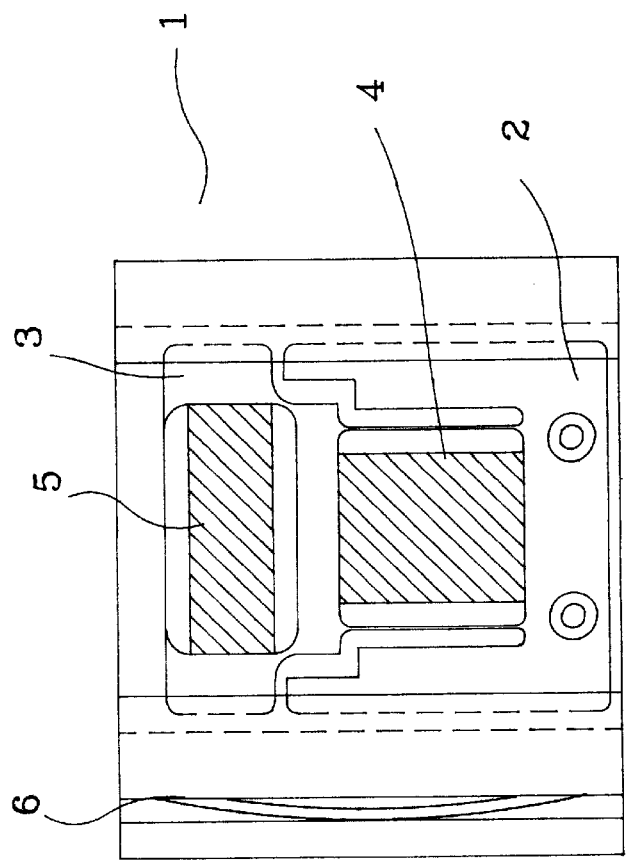
FIG. 1A is a top view of a conventional linear actuator.
Figure 1B:
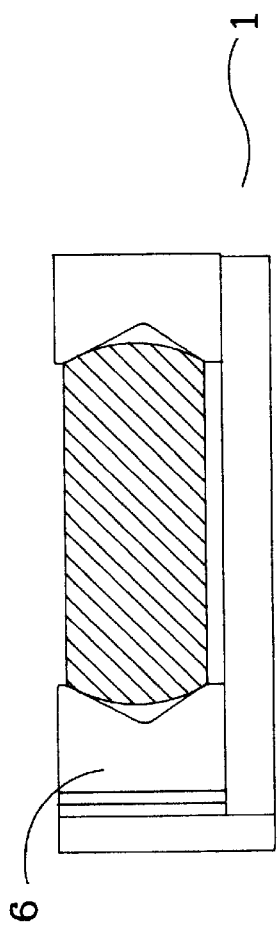
FIG. 1B is a cross sectional view of a conventional linear actuator.
Figure 2:
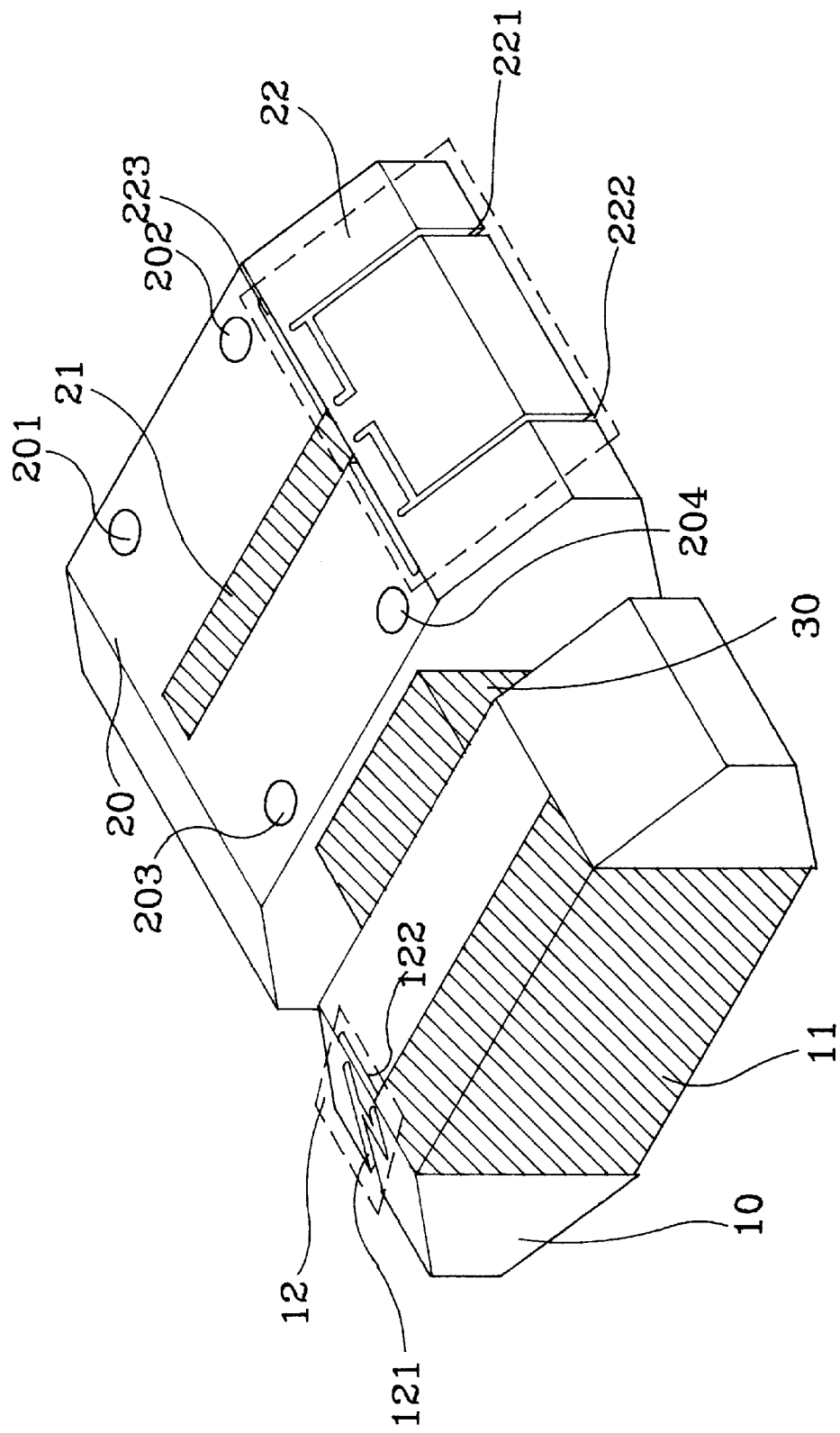
FIG. 2 is a perspective view of a first embodiment of this invention.
Figure 3:
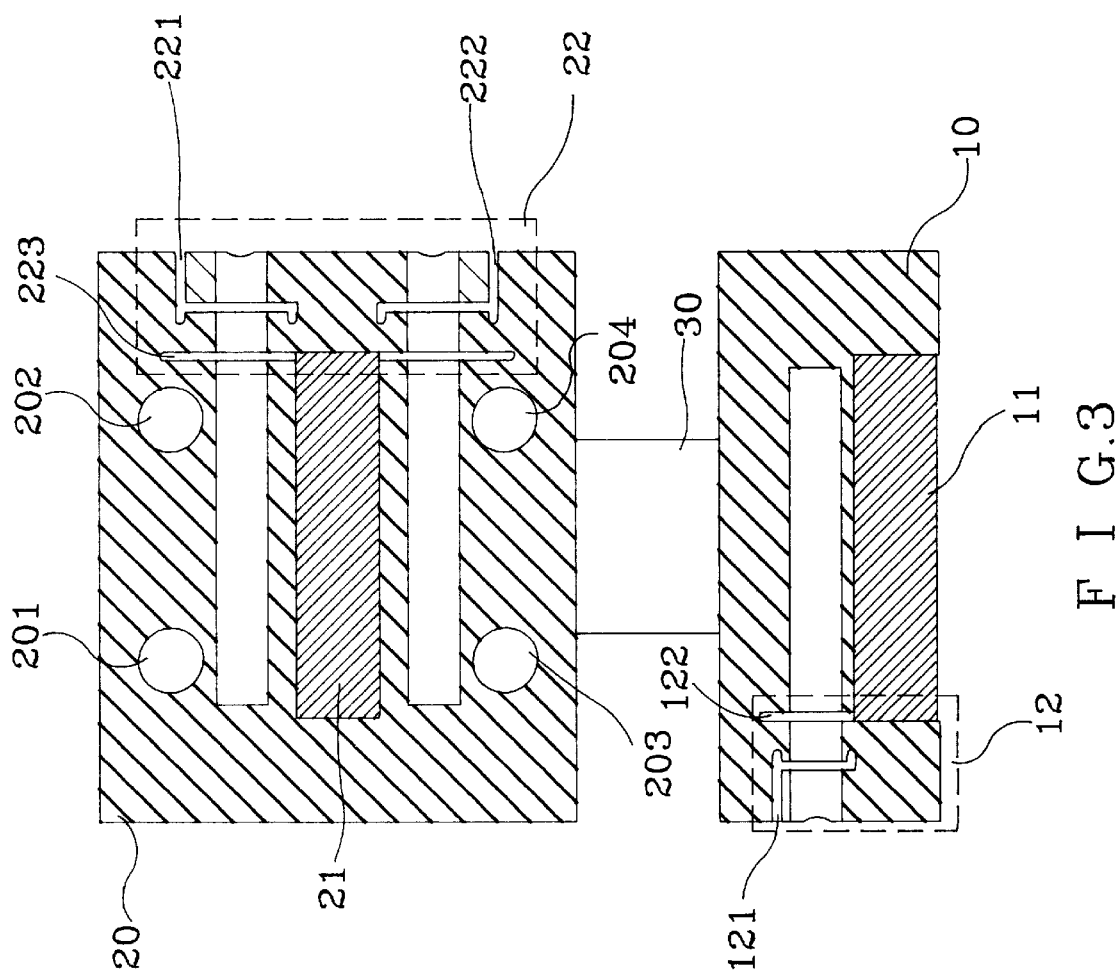
FIG. 3 is a sectional view of a first embodiment of this invention.

Referring to FIGS. 2 and 3, a linear actuator according to this invention includes a front seat 10, a back seat 20 and a micro feeding center piezoelectric member 30 connecting at two ends with the front seat and the back seat.

At one lateral end of the front seat 10, there is a first elastic zone 12 which has a L-shaped first slot 121 and an elongated second slot 122 formed therein. At a front end of the front seat 10, there is a first piezoelectric member 11 which has one end fixed while another end making contact with one side of the second slot 122. Therefore when the first piezoelectric member 11 is energized, it will extend or contract transversely, thus moves the first elastic zone 12 transversely. The transverse motion displacement may be controlled accurately and down to micro meter level.

In the back seat 20, there is a second elastic zone 22 on another lateral end opposite to the first elastic zone 12. In the second elastic zone 22, there are a pair of L-shaped third slots 221 and 222 which are symmetrically formed, and an elongated fourth slot 223. There is also a second piezoelectric member 21 which has one end fixed while another end making contact with one side of the fourth slot 223 at a middle portion. When the second piezoelectric member 21 is energized, another end of the second piezoelectric member 21 will extend or contract to move the second elastic zone 22 outward or inward evenly and accurately down to micro meter distance level (also shown in FIG. 4). The back seat 20 further has four screw openings 201, 202, 203, and 204 for assembly use.

The center piezoelectric member 30, when energized, provides a longitudinal micro feeding movement of this actuator down to micro meter level. The actuator is wedged and movable within a rail frame (not shown in the figures).

Figure 5:
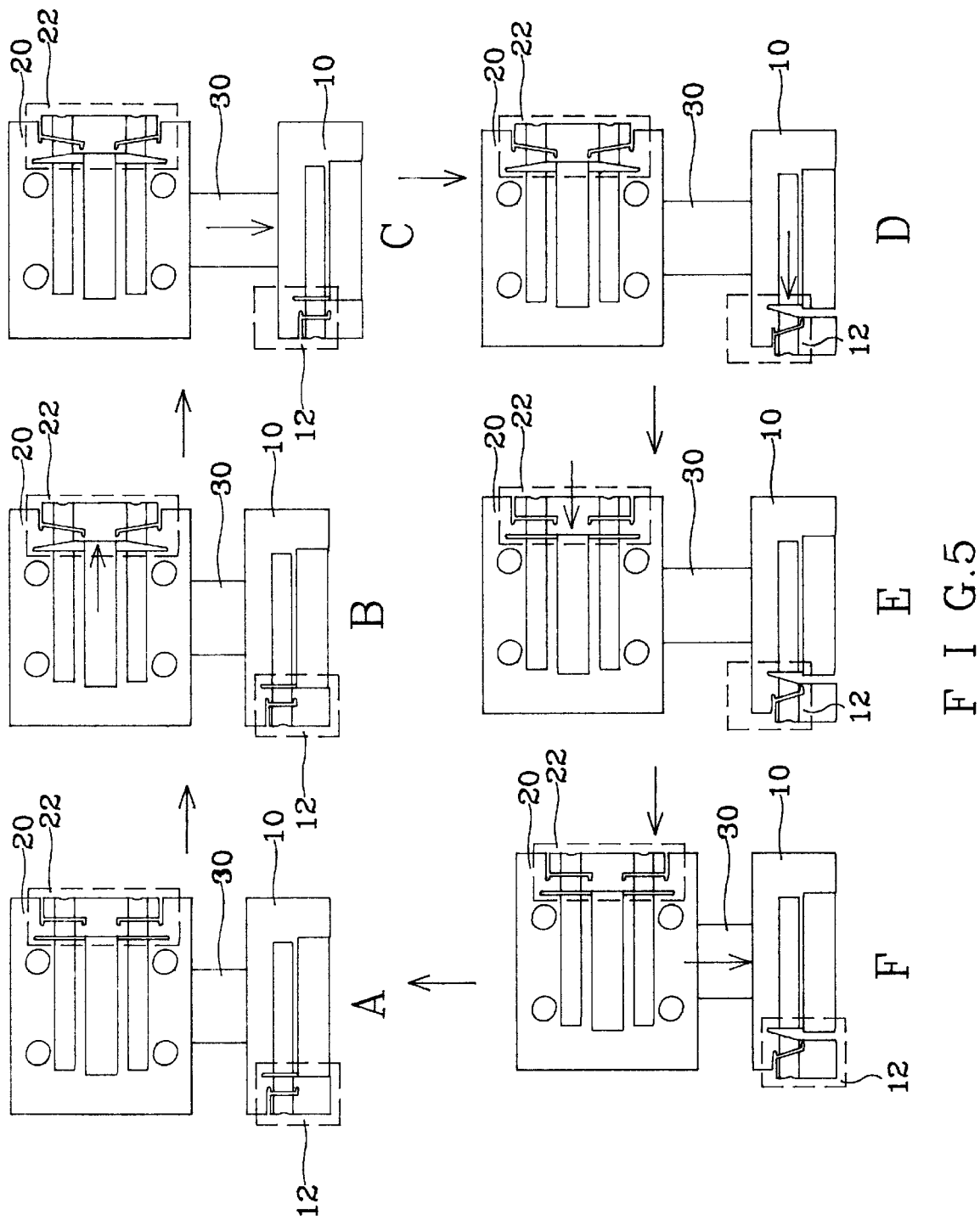
FIG. 5 is the top views of various operation steps of the embodiment shown in FIG. 2.

FIG. 5 illustrates the operation steps of this invention, the action procedure is described as follow:

Step 1: All piezoelectric members 11, 21 and 30 are not being energized. The actuator is stationary (FIG. 5, A).

Step 2: The second piezoelectric member 21 is energized and extended laterally. The second elastic zone 22 is thus pushed and extended laterally against the rail frame (not shown) to make the back seat 20 engaging firmly with the rail frame.

Step 3: The center piezoelectric member 30 is energized and extended in forward direction, and pushing the front seat 10 forward. The advancing distance may be made accurately down to micro meter level, while the back seat 20 remains stationary (FIG. 5, C).

Step 4: The first piezoelectric member 11 is energized and extended laterally. The first elastic zone 12 is pushed sideward to engage firmly with the rail frame (not shown). The back seat 20 also engages with the rail frame and remains stationary. The center piezoelectric member 30 remains at extending; state FIG. 5, D).

Step 5: The second piezoelectric member 21 is disenergized. The second elastic zone 22 is thus contracted and disengaged with the rail frame. The center and first piezoelectric members 30 and 11 are still being energized and maintain extending and stationary states (FIG. 5, E).

Step 6: The center piezoelectric member 30 is disenergized. It is contracted and moves the back seat 20 forward to a distance which the center piezoelectric member 30 being extended at the step 3. The front seat 10 remains stationary. Thus the whole actuator is moved forward at a distance of the extension distance of the center piezoelectric member 30. It can be controlled accurately and down to micro meter level. (FIG. 5, F). After this step, the first piezoelectric member 11 may be disenergized to free the front seat from the rail frame. This returns to the Step 1 for another cycle of operation.

The principle of energizing the piezoelectric members and the circuitry being used are known in the art, and form not part of this invention, and therefore is omitted herein.

Figure 6:
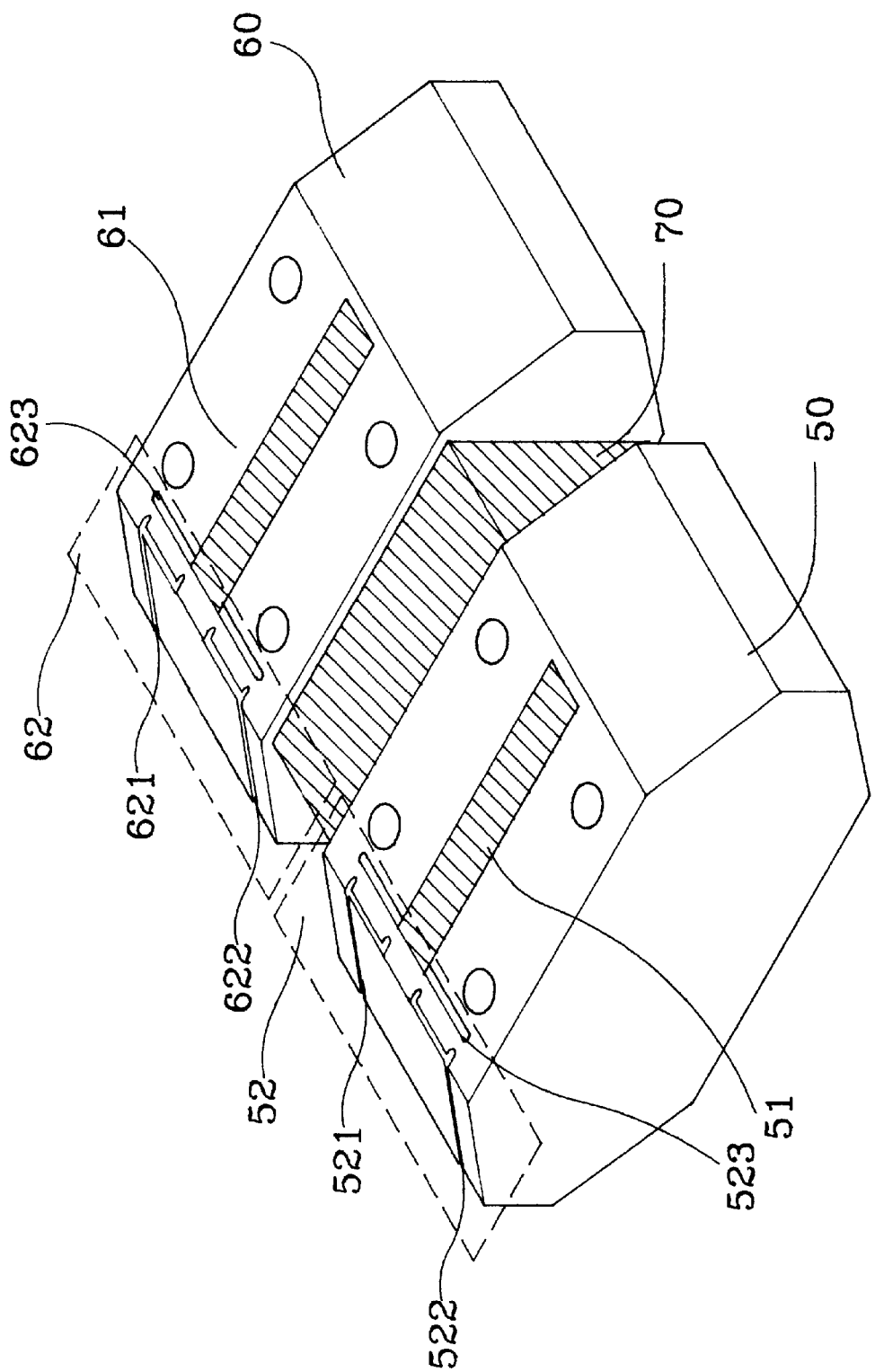
FIG. 6 is a perspective view of a second embodiment of this invention.
Figure 7:
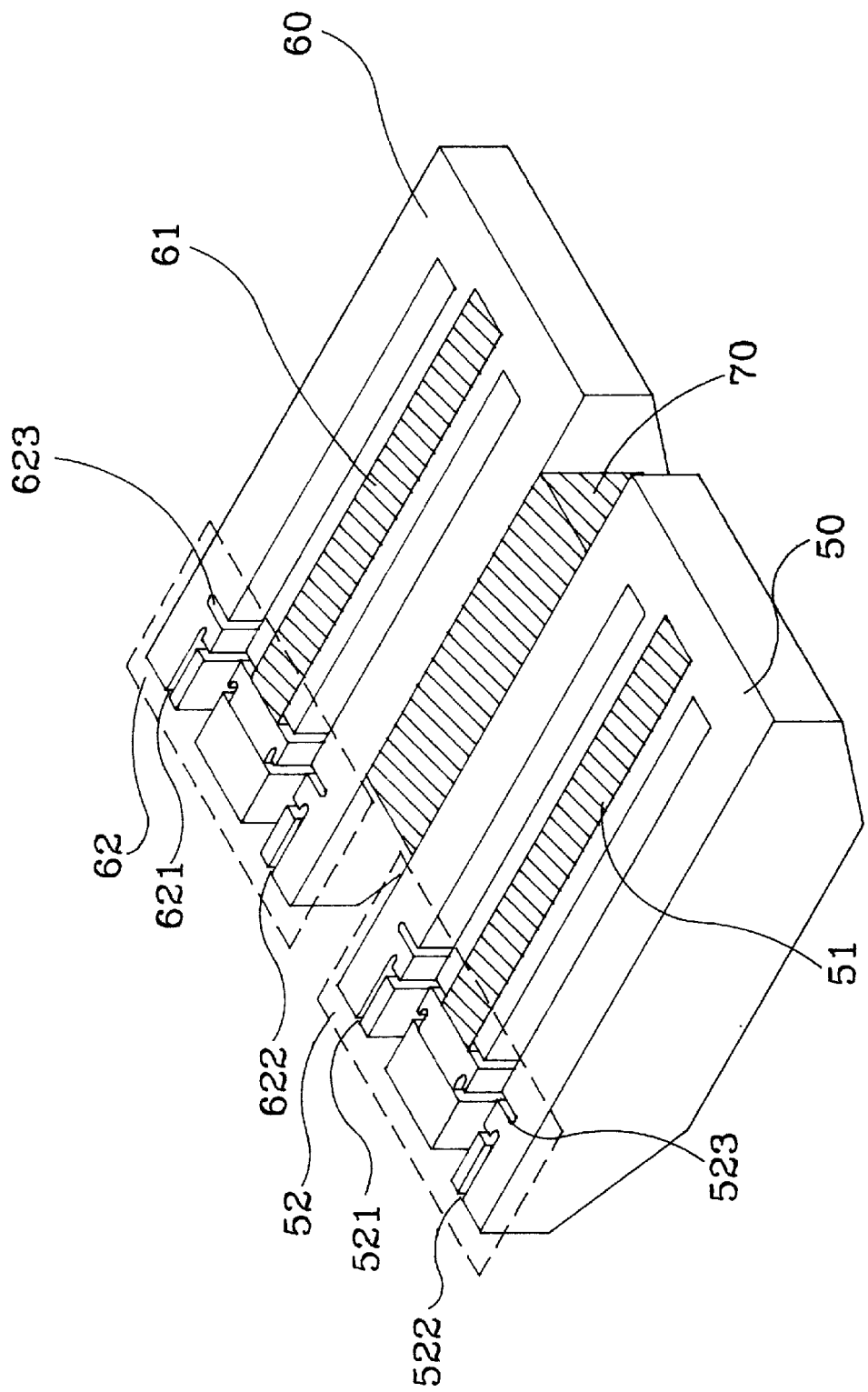
FIG. 7 is a perspective view, partly cutaway, of the embodiment shown in FIG. 6.

FIGS. 6 and 7 illustrate a second embodiment of this invention. It is generally constructed like the one shown in FIG. 2 except that the front seat 50 is constructed like the back seat 60. Each seat has a flat top and bottom surface and two slant surfaces at each of the two lateral edges. In one lateral edge of the front seat 10, there is a first elastic zone 52 which has a pair of first L-shaped slots 521 and 522 and an elongated second slot 523, and a first piezoelectric member 51 which has one end fixed and another end making contact with a lateral size of the second slot 523.

Besides being slant surfaced at two lateral edges, the lateral edge of the front and back seats may also be made curved or rectangular.

The back seat 60 is similarly structured like the front seat. It includes a second elastic zone 62 located at the same side of the first elastic zone 52. It also has a pair of L-shaped third slots 621 and 622 and an elongated fourth slot 623. There is also a second piezoelectric member 61 contact with a lateral side of the fourth slot 623. There is a center piezoelectric member 70 located between the front seat 50 and back seat 60. By energizing the piezoelectric members 51, 61 and 70 alternately, the actuator may make micro linear motion in forward direction like the steps shown in FIG. 5.

Figure 8:
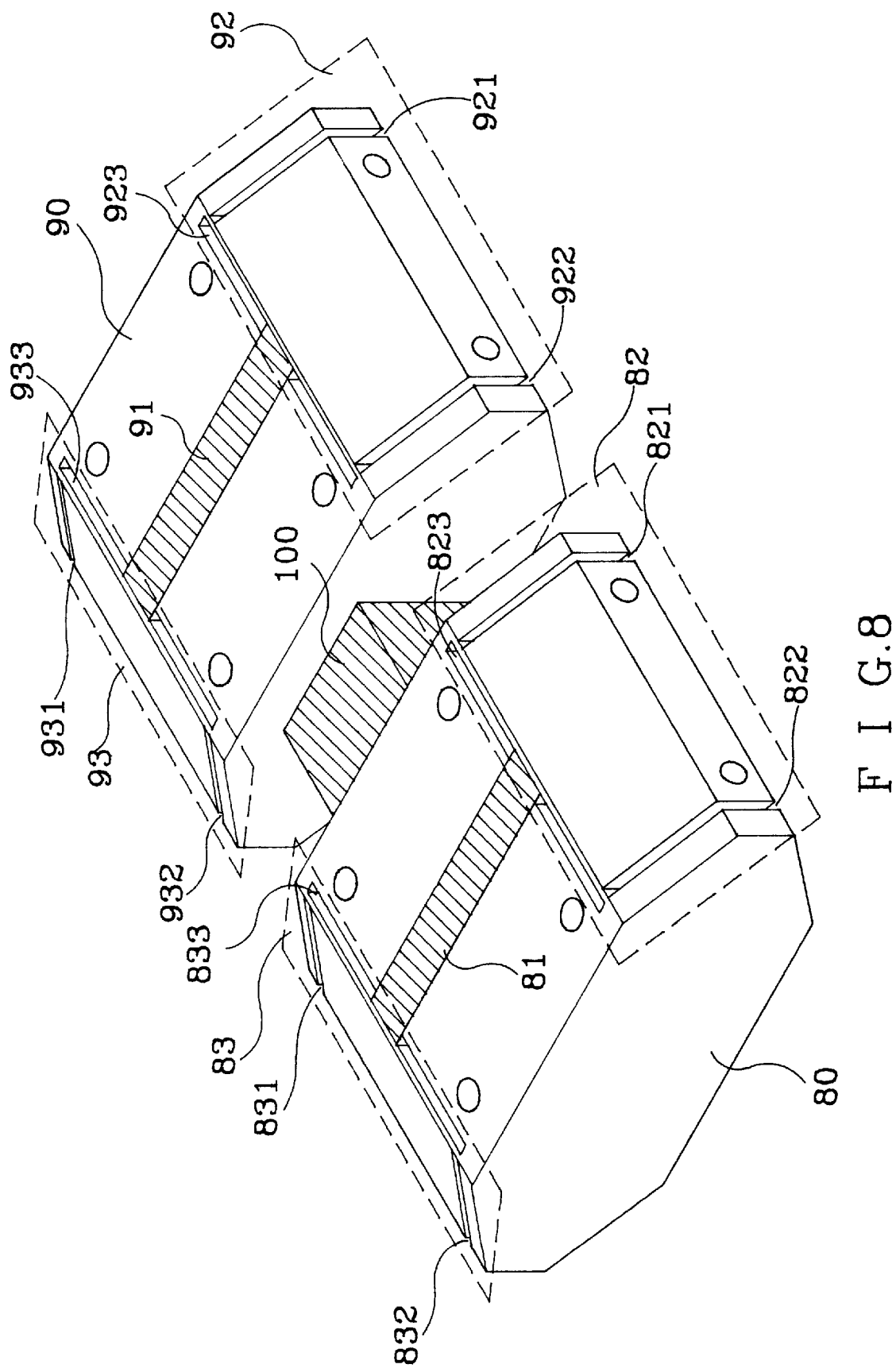
FIG. 8 is a perspective view of a third embodiment of this invention.

FIGS. 8 and 9 show a third embodiment of this invention. It is generally constructed like the one shown in FIG. 6 except that both the front seat 80 and the back seat 90 has respectively two elastic zones 82 and 83, and 92 and 93 at two lateral sides. In each elastic zone, there are a pair of spaced transverse slots 821, 822 (also 831, 832, 921, 922 and 931, 932) and a longitudinal slot 823 (also 833, 923 and 933). In the front seat, there is a first piezoelectric member 81 with both ends making contact with the lateral side of the longitudinal slots 823 and 833. Similarly the back seat has a second piezoelectric member 91 making contact with the lateral sides of the slots 923 and 933. A center piezoelectric member 100 is set between the front seat 80 and back seat 90. The operation steps are substantially similar to those shown in FIG. 5 and hence are omitted here.

What is claimed is:

1. A linear actuator comprising:
    two spaced seats, each seat having an elongated end piezoelectric member and only one deformable elastic zone disposed at one end of said end piezoelectric member; and
    a center piezoelectric member located between the two seats for providing micro liner movement in a first direction for the actuator;
    wherein:
    said center piezoelectric member is rectangular in shape defined by four opposing side faces, and said center piezoelectric member is directly connected to said two spaced seats at two said opposing side faces, respectively:
    said end piezoelectric members are elongated in a direction which is coplanar with and perpendicular to said first direction; and
    each said elastic zone is partially connected from said seat in such a manner that, when said end piezoelectric member is energized, a corresponding said elastic zone will be urged sidewardly outward by said end piezoelectric member in a direction coplanar with and perpendicular to said first direction, to engage with a rail frame.

2. A linear actuator of claim 1, wherein the seat has a plurality of openings.

3. A linear actuator of claim 1, wherein the elastic zone has a L-shaped slot and an elongated slot which are extendable when the piezoelectric member being energized and extended.

4. A linear actuator of claim 1, wherein the elastic zone has a pair of symmetrical L-shaped slots and an elongated slot which are extendable when the piezoelectric member being energized and extended.

5. A linear actuator of claim 1, wherein the actuator has two slant up and down edges on each of two lateral sides, the elastic zone being located in one slant edge.

6. A linear actuator of claim 1, wherein the actuator has a rectangular edge on each of two lateral sides, the elastic zone being located in at least one rectangular edge.

7. A linear actuator of claim 1, wherein the actuator has a curved shape edge on each of two lateral sides, the elastic zone being located in one curved edge.

8. A linear actuator of claim 1, wherein the seats are longitudinally positioned with a front set including a first piezoelectric member, a back seat including a second piezoelectric member, and the center piezoelectric member connecting the front and back seats at two ends thereof, the actuator being mounted in a rail frame and movable as following steps:
    a. all piezoelectric members receiving no external voltage, the actuator being stationary;
    b. the second piezoelectric member being energized and extending transversely, the elastic zone in the back seat being extended transversely and engaging firmly with the rail frame;
    c. the center piezoelectric member being energized and extending, longitudinally to push the front seat moving longitudinally at a distance;
    d. the first piezoelectric member being energized and extending transversely, the elastic zone in the front seat being extended transversely and engaging firmly with the rail frame;
    e. the second piezoelectric member being disenergized, the elastic zone in the back seat being disengaged with the rail frame;
    f. the center piezoelectric member being disenergized, contracting and moving the back seat longitudinally to a distance, the first piezoelectric member then being disenergized to disengage the elastic zone of the front seat from the rail frame;
    wherein the actuator being moved longitudinally at a distance equal to the extending distance of the center piezoelectric member in the step C.

9. A linear actuator of claim 1, wherein the two seats are identically constructed, each seat having a piezoelectric member only one elastic zone.

* * * * *